United States Patent [19]

Lutz, Jr.

[11] 3,755,224

[45] Aug. 28, 1973

[54] BIOCIDE FOR PLASTICIZED PVC

[75] Inventor: John T. Lutz, Jr., Cornwells Heights, Pa.

[73] Assignee: Rohm and Haas Company, Philadelphia, Pa.

[22] Filed: Mar. 12, 1971

[21] Appl. No.: 123,861

[52] U.S. Cl......... 260/23 EP, 252/182, 260/23 XA, 260/31.6, 260/45.8 SN, 424/270
[51] Int. Cl. ............................................. C08f 45/64
[58] Field of Search ............................ 260/45.8 SN; 424/270

[56] References Cited
UNITED STATES PATENTS

| | | | |
|---|---|---|---|
| 2,922,794 | 1/1960 | Model et al........................ | 260/304 |
| 3,012,039 | 12/1961 | Morley............................... | 260/304 |
| 2,616,893 | 11/1952 | Newby................................ | 260/302 |
| 3,155,678 | 11/1964 | Hatchard........................... | 260/302 |
| 3,288,674 | 11/1966 | Yeager................................ | 424/78 |
| 2,632,746 | 3/1953 | Darby.................................. | 260/23 |
| 3,154,518 | 10/1964 | Gradsten et al. .................. | 260/45.9 |
| 3,214,453 | 10/1965 | Stern, Jr. ........................... | 260/429.7 |
| 3,371,063 | 2/1968 | Girard................................ | 260/45.8 |
| 3,445,249 | 5/1969 | Leebrick............................ | 106/15 |

FOREIGN PATENTS OR APPLICATIONS 711,880   9/1968   Belgium

*Primary Examiner*—Donald E. Czaja
*Assistant Examiner*—R. A. White
*Attorney*—George W. F. Simmons, Carl A. Castellan and Philip D. Freedman

[57] ABSTRACT

Vinyl chloride compositions having biocidal properties comprise a vinyl chloride resin and a 3-isothiazolone. Preferably the vinyl chloride compositions are formed by blending the vinyl chloride resin with a liquid plasticizer, such as epoxidized soybean oil, containing the 3-isothiazolone.

21 Claims, No Drawings

BIOCIDE FOR PLASTICIZED PVC

This invention relates to vinyl chloride compositions having biocidal properties and to liquid plasticizer compositions containing a 3-isothiazolone. More particularly it relates to molded or moldable vinyl chloride compositions and to plasticizing compositions containing a 3-isothiazolone which can be incorporated into poly(vinyl chloride) (PVC) compositions.

As discussed by Yeager, U.S. Pat. No. 3,288,674, issued Nov. 29, 1966, generally direct microbiocidal and fungal attack on resinous materials such as polyvinyl esters is not a problem. However, additives such as plasticizers and lubricants can act as nutrients for micoorganisms. Also the surface of the resinous articles may become contaminated and mircoorganism growth may occur. The resinous compositions are then subject to deterioration through bacterial and fungal attack on plasticizers which have been incorporated into the resins to impart desirable physical properties and to facilitate forming operations.

Biocides are incorporated into the resin compositions to protect them from such bacterial and fungal deterioration. Many agents which are useful biocides in other applications however are not suitable for use in resin compositions particularly vinyl chloride polymer compositions for various reasons. Suitable agents must be good biocides in the particular resin environment and must be soluble or intimately dispersible in the resin and plasticizer, if used. To be commercially suitable the agent for most uses must not contribute objectionable color, should be relatively inexpensive and active at concentrations at which the agent will not adversely affect the basic desirable properties of the resin. The agent must be relatively non-volatile so that the biocidal characteristics of the resulting resin compositions will be retained over extended periods of use. Finally, the agent must be heat stable so that biocidal properties are not lost through decomposition of the agent during processing or forming operations.

The biocides of the present invention fulfill the rigid requirements of a suitable biocide for vinyl halide polymers. Additionally the present biocides do not contain any heavy metal therefore avoiding any environmental contamination difficulties which could possibly arise during preparation of the biocide, processing or forming of the vinyl halide composition or during extended use of the composition. Finally the biocides of the present invention are additionally advantageous in that plasticizer compositions containing the agent may be prepared by merely mixing the components. No involved preparation procedure is necessary.

The present invention relates to an intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith a microbiocidal amount of a 3-isothiazolone. The suitable 3-isothiazolone are disclosed by Lewis et al., U.S. Pat. application Ser. No. 836,660, filed June 25, 1969. These 3-isothiazolones a are represented by the formula

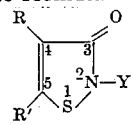

wherein Y is an unsubstituted or substituted alkyl, alkenyl, or alkynyl group of 1 to 18 carbon atoms, preferably 4 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms, R is hydrogen, halogen, or a $(C_1-C_4)$alkyl group, and R' is hydrogen, halogen, or a $(C_1-C_4)$alkyl group, provided that when Y is methyl or ethyl then both R and R' may not be hydrogen.

By a substituted aklyl group is meant an alkyl group having one or more of its hydrogen atoms replaced by another substituent group. Examples of the substituted alkyl groups which characterize the 3-isothiazolones of this invention include hydroxyalkyl, haloalkyl, cyanoalkyl, alkylaminoalkyl, dialkylaminoalkyl, arylaminoalkyl, carboxyalkyl, carbalkoxyalkyl, aldoxyalkyl, acryloxyalkyl, alkylthioalkyl, arylthioalkyl, haloalkoxyalkyl, cycloalkylaminoalkyl, such as morpholinoalkyl, piperiodinoalkyl, pyrrolidonyalkyl, and the like, carbamoxyalkyl, alkenyl, haloalkenyl, alkynyl, haloalkynyl, isothiazolonylalkyl, and the like.

By a substituted aralkyl group is meant an aralkyl group having one or more of the hydrogen atoms on either the aryl ring or the alkyl chain replaced by another substituent group. Examples of the substituted aralkyl groups which characterize the 3-isothiazolones of this invention include halogen-, lower alkyl-, or lower alkoxy-substituted aralkyl groups, and the like.

By a substituted aryl group is meant an aryl group, such as benzene, naphthalene, or pyridine, having one or more of the hydrogen atoms on the aryl ring replaced by another substituent group. Examples of such substituent groups include halogen, nitro, lower alkyl, lower alkylacrylamino, lower carbalkoxy, sulfamyl, and the like.

The isothiazolones described above can form novel acid salts which also exhibit biocidal activity in vinyl chloride polymer compositions. Preparation of these biocidally active salts is readily achieved by reacting the above designated 3-isothiazolones with a strong inorganic or organic acid. Typical strong acids include hydrochloric, nitric, sulfuric, hydrobromic, chlroosulfuric, chloroacetic, oxalic, maleic, succinic, p-toluenesulfonic, and the like. Separation of the acid salts from the reaction medium is accomplished by any convenient means known to one skilled in the art.

Representative Y substituents include methyl, ethyl, propyl, isopropyl, butyl, hexyl, oxtyl, decyl, pentadecyl, octadecyl, cyclopropyl, cyclohexyl, benzyl, 3,4-dichlorbenzyl, 4-methoxybenzyl, 4-chlorobenzyl, 3,4-dichlrophenyl, hydroxymethyl, chloromethyl, chloropropyl, diethylaminoethyl, cyanoethyl, carbomethoxyethyl, ethoxyethyl, 2-methoxy-1-bromoethyl, 3,3,5-trimethylcyclohexyl, phenoxyethyl, p-chloroanilinomethyl, phenylcarbamoxymethyl, allyl, propynyl, vinyl, carboxyethyl, 1-isothiazolonylethyl, and 1,2,2-trichlorovinyl.

Representative R substituents include hydrogen, bromo, chloro, iodo, methyl, ethyl, propyl, isopropyl, butyl and t-butyl.

Representative R' substituents are hydrogen, chloro, bromo, iodo, methyl, ethyl, propyl, isopropyl, butyl, t- butyl, chloromethylm chloropropyl, bromomethyl, bromoethyl, and bromopropyl.

Typical compounds within the scope of Formula I are listed in copending U. S. Pat. Application Ser. No. 836,660 as are various methods of preparing the 3-isothiazolones.

The 3-isothiazolones are preferably mixed with a plasticizer such as epoxidized soybean oil and the mixture blended with the vinyl chloride resin. The present invention therefore also relates to compositions of matter useful for plasticizig vinyl resins and imparting microbiocidal properties thereto which compositions comprise a liquid plasticizer for vinyl resins and a microbiocidal amount of the 3-isothiazolone. The preferred plasticizers are epoxidized oils such as those disclosed in U.S. Pat. Nos. 2,458,484; 2,485,160; 2,556,145; 2,559,177; 2,569,502; 2,963,455 and copending patent application Conyne et al., Ser. No. 39,556, filed May 21, 1970. Other suitable plasticizers include alkyl diesters of dibasic acids such as adipic, azelaic, sebacic, phthalic, etc.; epoxidized esters of oleic and Tall oil fatty acids; polyesters comprising polyhydric alcohols, dibasic acids, and monohydric alcohols or monobasic fatty acids and other types well known to those skilled in the art.

As taught by the above references, the plasticizers may be of a wide variety. They include the aliphatic and cycloaliphatic, aryl and aralkyl esters of an epoxy fatty acid, the fatty acid group containing from 8 to 22 carbon atoms. The fatty acid group may be derived from any animal, vegetable, or marine oil containing unsaturated fatty acid groups; they may be derived from the mixed fatty acids contained in such oils; or may be derived from isolated unsaturated fatty acids. A wide variety of alcohol groups may be used for esterification of the epoxy fatty acid. These alcohols include those having a hydrocarbon group attached to the hydroxyl group and include particularly monohydric aliphatic alcohols such as methyl, ethyl, propyl, butyl alcohols, and the like; polyhydric alcohols such as the glycols, diethylene glycol, and the like; glycerols and polyglycerols, etc. The alcohols used for esterification also include the aromatic alcohols such as phenol; the aralkyl alcohols such as benzyl alcohol; and cycloaliphatic alcohols such as cyclohexanol.

Finally, the present invention also relates to intimately mixed vinyl chloride resin compositions having biocidal properties comprising a vinyl chloride polymer selected from the group consisting of homopolymers of vinyl chloride and copolymers of vinyl chloride with minor proportions of other ethylenically unsaturated monomers and blended therewith the mixture of the plasticizer and the 3-isothiazolone described above.

The vinyl chloride resins useful in this invention include homopolymers of vinyl chlorides as well as copolymers thereof with minor proportions of other ethylenically unsaturated compounds. Preferably, the vinyl chloride resin employed is a homopolymer of vinyl chloride, i.e., polyvinyl chloride, since the most rigid compositions are ultimately obtainable therefrom. However, the vinyl chloride resin can also contain up to about twenty percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this respect include, for example, vinyl alkanoate, such as vinyl acetate, vinyl propionate, and the like; vinyl halides, such as vinylidene bromide, vinylidene chloride, vinylidene fluorochloride, and the like; unsaturated hydrocarbons, such as ethylene, propylene, isobutylene and the like; allyl compounds such as allyl acetate, allyl chloride, allyl ethyl ether and the like, etc. Thus, as employed herein, the term "vinyl chloride resin" is meant to include both poly(vinyl chloride), and copolymers of vinyl chloride with other ethylenically unsaturated monomers.

The vinyl chloride resin compositions of the invention contain the 3-isothiazolone additive in a microbiocidal amount, i.e., in an amount sufficient to impart microbiocidal properties to the resin compositions, more precisely to the plasticizers, stabilizers and lubricants of the resin compositions. Generally, the amount of microbiocide is in the range of about 0.05 to 0.5 percent by weight based on the total combined weight of the resin composition, although slightly greater or lesser amounts may be used. Preferably, the 3-isothiazolone is used in the 0.05 to 0.1 percent by weight range. The amount of plasticizer depends upon the particular use of the resulting resin composition and may be determined by one skilled in the art according to prior art teachings.

The vinyl chloride resin compositions of the invention in addition to containing the 3-isothiazolone and the plasticizer may also contain various conventional additives such as processing aids, extenders, fillers, dyes, pigments and stabilizers. Whenever an epoxidized soybean oil is used as the plasticizer it may be the sole plasticizer used but preferably it is used in conjunction with other plasticizers known in the art.

The vinyl chloride compositions may be prepared by any method for mixing and processing known in the art. These include preparation of dry-blends and dispersions (plastisols) and fabrication of the same by appropriate methods such as milling, calendering, casting, extrusion or molding.

The vinyl chloride resin compositions of this invention have a variety of uses including shower curtains, boat covers, wall coverings, automotive trim, awnings, building materials, auto seat covers, swimming pool liners and covers, vinyl gaskets, air structures, garden hose, tents and tarpaulines, vinyl rug backings, floor tiles, cable compounds, vinyl upholstery and agricultural mulches.

The examples provided below are illustrative of the invention. All parts, ratios and percentages are by weight unless otherwise specified.

EXAMPLE 1

This example illustrates the preparation of the plasticizer/3-isothiazolone compositions.

An epoxidized soybean oil plasticizer (97.85 grams) is heated to about 60°C. To the plasticizer is added 2.15 grams of 2-n-octyl-3-isothiazolone (93 percent active) and the resulting mixture is mixed with a motor-driven propellor blade at 25°C. for about 15 minutes.

EXAMPLES 2 TO 5

The following vinyl chloride resin formulations are prepared by dry-blending:

| I | | II | |
|---|---|---|---|
| poly(vinyl chloride)[1] | 100 g. | poly(vinyl chloride)[1] | 100 g. |

| | | | |
|---|---|---|---|
| plasticizer(adipic acid-butylene glycol polyester, terminated with palmitic acid) | 67 g. | plasticizer (adipic acid-butylene glycol polyester, terminated with palmitic acid) | 67 g. |
| the biocidal composition of Example 1 | 5 g. | plasticizer (epoxidized soybean oil) | 5 g. |
| barium-cadmium stabilizer | 1.7 g. | barium-cadmium stabilizer | 1.7 g. |
| III | | IV | |
| poly(vinyl chloride)[1] | 100 g. | poly(vinyl chloride)[1] | 100 g. |
| plasticizer (adipic acid-butylene glycol polyester, terminated with palmitic acid) | 90 g. | plasticizer (adipic acid-butylene glycol polyester, terminated with palmitic acid) | 90 g. |
| the biocidal composition of Example 1 | 10 g. | plasticizer (epoxidized soybean oil) | 10 g. |
| barium-cadmium stabilizer | 2 g. | barium-cadmium stabilizer | 2 g. |
| CaCO₃ | 50 g. | CaCO₃ | 50 g. |
| stearic acid | 0.25 g. | stearic aicd | 0.25 g. |

1 Geon 101

The formulations are milled on a 2-roll plastics compounding mill for 7 minutes at 325°F. The resulting films (10 mil.) are removed for testing for fungicidal activity.

EXAMPLES 6 TO 9

Test specimens (one inch square) of each of the above formulations are sprayed with a mixed spore suspension of the following cultures: (a) *Penicillium funiculosum*, (b) *Chaetomium globosun*, (c) *Aspergillus niger*.

After spraying, the test films are placed in a petri dish on a sterile agar medium containing the following ingredients: $NH_4NO_3$(3.0 gm.), $KH_2PO_4$(4.0 gm.), $MgSO_4 \cdot 7H_2O$(0.25 gm.), $KCl$(0.25 gm.), agar(17.5 gm.) and $H_2O$ to 1000 mil. A sterile moistened absorbent pad is placed in the petri dish lid. Dishes are incubated at room temperature for 30 days and observations for fungus growth on the surface of the specimens are taken with the results as shown in TABLE 1.

TABLE 1

| Formulation | Growth of fungus on film | |
|---|---|---|
| | 1 Week | 4 Weeks |
| I | None | None |
| II | Definite | Definite |
| III | None | None |
| IV | Definite | Definite |

Examples 10 TO 17

Poly(vinyl chloride) formulations are prepared as indicated in TABLE 2 and are tested in the Surface Inoculation Mildew Test as described in Examples 6 to 9 and the Zone of Inhibition Test as described as follows: A 12 mm. disc is cut from each of the test film formulations with a No. 9 cork borer. The disc is placed on a nutrient agar surface contained in a sterile petri dish. The nutrient agar has been seeded with a spore suspension of an *Asperigillus niger* culture. The petri dish is incubated for 7 to 10 days at 30°C., at which time observations and measurements (in mm.) for a zone of inhibition are taken.

The formulations (in parts) and results of tests are shown in the TABLE 2. The formulations designated "a" are prepared by hot milling, those designated "b" are cast from solution then aged 7 minutes at 325°F.

TABLE 2

| | 1a | 2a | 3b | 4b | 5b | 6b | 7a | 8a |
|---|---|---|---|---|---|---|---|---|
| PVC (Geon 101) | 100 | 100 | 100 | 100 | 100 | 100 | 100 | 1 |
| Di-octyl phthalate | 45 | 45 | | | | | | |
| Plasticizer (adipic acid-butylene glycol polyester, terminated with palmitic acid) | | | 67 | 67 | 67 | 67 | 67 | 67 |
| Plasticizer (epoxidized soybean oil) | 5 | 4.995 | 5 | 4.975 | 4.95 | 4.9 | 5 | 4.95 |
| Composition of Example 1 | | 0.005 | | 0.025 | 0.05 | 0.1 | | 0.05 |
| Barium-cadmium stabilizer (Ferro 1820) | 1.7 | 1.7 | | | | | | |
| Barium-cadmium stabilizer (Ferro 1212A) | | | 1.7 | 1.7 | 1.7 | 1.7 | 1.7 | 1.7 |
| Heat stability: | | | | | | | | |
| 350° F., hours to black | | | 5+ | 5+ | 5+ | 5+ | | |
| 375° F., hours to black | 1.5 | 1.5 | | | | | 1.5 | 1.5 |
| Zone of inhibition, mm | None | Small | None | 1 | 7 | 11 | None | 3 |
| Mildew growth | | | (¹) | (²) | (³) | (³) | (¹) | (⁴) |

1 Definite after 1 week.
2 Definite after 3-4 weeks.
3 None in 4 weeks.
4 Slight after 3, definite after 4 weeks.

The above Examples illustrate the biocidal activity of the compositions of the present invention. Additionally, the Examples 10 to 17 show that the heat stabilizing properties of the epoxidized soybean oil plasticizer are not significantly impaired by the incorporation of the biocide.

It is notable that a known biocide of compositions similar to that of the present 3-isothiazolones does not exhibit biocidal activity in vinyl halide resin compositions. Thus, 3-hydroxyisothiazole disclosed as a biocide by Lewis et al., pending U.S. Pat. application, Ser. No. 855,046, is not active in vinyl halide resin compositions.

What is claimed is:

1. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith a microbiocidal amount of a compound of the formula

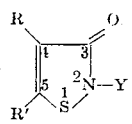

wherein Y is an unsubstituted or substituted alkyl, ALKENYL, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms, R is hydrogen, halogen, or a ($C_1$–$C_4$) alkyl group, and R' is hydrogen, halogen or a ($C_1$–$C_4$) alkyl group, provided that when Y is methyl or ethyl then both R and R' may not be hydrogen.

2. A compound according to claim 1 wherein Y is an unsubstitited alkyl group of 3 to 18 carbon atoms.

3. A compound according to claim 1 wherein Y IS n-butyl or t-butyl, R is hydrogen, and R' is hydrogen.

4. A compound according to claim 1 whrerein Y is n-propyl, R is hydrogen, and R' is hydrogen.

5. A compound according to claim 1 wherein Y is n-hexyl, R is hydrogen, and R' is hydrogen.

6. A compound according to claim 1 wherein Y is n-octyl or t-octyl, R is hydrogen, and R' is hydrogen.

7. A compound according to claim 1 wherein Y is n-decyl, R is hydrogen, and R' is hydrogen.

8. A compound according to claim 1 wherein Y is cyclohexyl, R is hydrogen, and R' is hydrogen.

9. A compound according to claim 1 wherein Y is benzyl, R is hydrogen, and R' is hydrogen.

10. A composition of matter useful for plasticizing vinyl resins and imparting microbiocidal properties thereto which comprises a liquid plasticizer for vinyl resins and a microbiocidal amount of the compound defined in claim 1.

11. A composition of matter useful for plasticiaing vinyl resins and imparting microbiocidal properties thereto which comprises a liquid plasticizer for vinyl resins and a microbiocidal amount of the compound defined in claim 2.

12. A composition of matter useful for plasticizing vinyl resins and imparting microbiocidal properties thereto which comprises a liquid plasticizer for vinyl resins and a microbiocidal amount of the compound defined in claim 6.

13. The composition of matter of claim 10 wherein the plasticizer comprises an epoxidized soybean oil.

14. The composition of matter of claim 11 wherein the plasticizer comprises an epoxidized soybean oil.

15. The compositions of matter of claim 12 wherein the plasticizer comprises an epoxidized soybean oil.

16. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith the composition of matter of claim 10.

17. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith the composition of matter of claim 11.

18. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith the composition of matter of claim 12.

19. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated momomers and blended therewith the composition of matter of claim 13.

20. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith the composition of matter of claim 14.

21. An intimately mixed vinyl chloride resin composition having biocidal properties comprising a vinyl chloride polymer selected from the group consisting of homopolymers of vinyl chloride and copolymers of vinyl chloride with minor proportions of other ethylenically unsaturated monomers and blended therewith the composition of matter of claim 15.

* * * * *